United States Patent
Yoneyama et al.

(10) Patent No.: US 9,191,378 B2
(45) Date of Patent: Nov. 17, 2015

(54) COMMUNICATION APPARATUS AND COMMUNICATION METHOD

(71) Applicants: Seijiro Yoneyama, Yokohama (JP); Mitsuru Kanda, Tokyo (JP)

(72) Inventors: Seijiro Yoneyama, Yokohama (JP); Mitsuru Kanda, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 336 days.

(21) Appl. No.: 13/728,430

(22) Filed: Dec. 27, 2012

(65) Prior Publication Data

US 2013/0227290 A1    Aug. 29, 2013

(30) Foreign Application Priority Data

Feb. 27, 2012   (JP) ................................. 2012-040476

(51) Int. Cl.
*H04L 29/06*   (2006.01)
(52) U.S. Cl.
CPC .......... *H04L 63/061* (2013.01); *H04L 63/0869* (2013.01); *H04L 63/0884* (2013.01); *Y04S 40/24* (2013.01)
(58) Field of Classification Search
CPC .. H04L 63/061; H04L 63/0869; H04L 9/0844
See application file for complete search history.

(56) References Cited

U.S. PATENT DOCUMENTS

| | | | | |
|---|---|---|---|---|
| 5,299,263 | A * | 3/1994 | Beller et al. ................... | 380/30 |
| 6,192,473 | B1 * | 2/2001 | Ryan et al. .................... | 713/168 |
| 8,578,163 | B2 * | 11/2013 | Yao .............................. | 713/171 |
| 8,627,078 | B2 * | 1/2014 | Oba et al. ..................... | 713/168 |
| 8,707,043 | B2 * | 4/2014 | Wason et al. ................... | 713/171 |
| 8,826,410 | B2 * | 9/2014 | Sperling et al. ................. | 726/10 |
| 2007/0064950 | A1 * | 3/2007 | Suzuki et al. .................. | 380/270 |
| 2007/0121947 | A1 * | 5/2007 | Sood et al. .................... | 380/277 |
| 2008/0046732 | A1 * | 2/2008 | Fu et al. ........................ | 713/171 |
| 2008/0155250 | A1 * | 6/2008 | Tanizawa et al. ............. | 713/152 |
| 2008/0162939 | A1 * | 7/2008 | Lee et al. ...................... | 713/171 |
| 2009/0217047 | A1 * | 8/2009 | Akashika et al. ............. | 713/175 |
| 2010/0115272 | A1 * | 5/2010 | Batta ............................ | 713/162 |
| 2010/0228981 | A1 * | 9/2010 | Yao .............................. | 713/171 |

(Continued)

OTHER PUBLICATIONS

Das, S.; Ohba, Y.; Kanda, M.; Famolari, D.; Das, S.K., "A key management framework for AMI networks in smart grid," Aug. 2012, Communications Magazine, IEEE , vol. 50, No. 8, pp. 30,37.*

(Continued)

*Primary Examiner* — Eleni Shiferaw
*Assistant Examiner* — Nelson Giddins
(74) *Attorney, Agent, or Firm* — Ohlandt, Greeley, Ruggiero & Perle, L.L.P.

(57) ABSTRACT

According to an embodiment, a communication apparatus includes a security control unit. The security control unit establishes first and second secure communication channels to a first server which manages communication security keys and second server which provides a service regarding a smart meter, respectively when operation to the smart meter is started, performs mutual authentication with the first server and acquire a first key from the first server via the first secure communication channel, and relays mutual authentication with the first server and acquisition of a second key from the first server via the first secure communication channel for the smart meter.

11 Claims, 9 Drawing Sheets

(56) References Cited

U.S. PATENT DOCUMENTS

| | | | | |
|---|---|---|---|---|
| 2010/0241848 | A1* | 9/2010 | Smith et al. | 713/153 |
| 2011/0047370 | A1* | 2/2011 | Nagel et al. | 713/150 |
| 2011/0173448 | A1* | 7/2011 | Baentsch et al. | 713/169 |
| 2011/0317834 | A1* | 12/2011 | Chaturvedi et al. | 380/255 |
| 2012/0099587 | A1* | 4/2012 | Fan et al. | 370/389 |
| 2012/0137126 | A1* | 5/2012 | Matsuoka et al. | 713/156 |
| 2012/0182157 | A1* | 7/2012 | Carr | 340/870.02 |
| 2012/0320790 | A1* | 12/2012 | Shaffer et al. | 370/254 |
| 2012/0327792 | A1* | 12/2012 | Guo et al. | 370/252 |
| 2012/0328101 | A1* | 12/2012 | Lakshminarayanan | 380/258 |
| 2013/0041852 | A1* | 2/2013 | Ellis et al. | 705/412 |
| 2013/0067214 | A1* | 3/2013 | Tanaka et al. | 713/150 |
| 2013/0073852 | A1* | 3/2013 | Oba et al. | 713/168 |
| 2013/0205378 | A1* | 8/2013 | Oba et al. | 726/7 |
| 2013/0227157 | A1* | 8/2013 | Tanaka | 709/229 |
| 2013/0227290 | A1* | 8/2013 | Yoneyama et al. | 713/169 |

OTHER PUBLICATIONS

Fouda, M.M.; Fadlullah, Z.M.; Kato, N.; Rongxing Lu; Xuemin Shen, "A Lightweight Message Authentication Scheme for Smart Grid Communications," Dec. 2011, Smart Grid, IEEE Transactions,vol. 2, No. 4, pp. 675,685.*

Jinyue Xia; Yongge Wang, "Secure Key Distribution for the Smart Grid," Sep. 2012, Smart Grid, IEEE Transactions, vol. 3, No. 3, pp. 1437,1443.*

IETF RFC 6550 "RPL: Routing Protocol for Low-Power and Lossy Networks", T. Winter, Mar. 2012, consisting of 157 pages.

IETF RFC 6345 "Protocol for Carrying Authentication for Network Access (PANA) Relay Element", P. Duffy, Aug. 2011, consisting of 12 pages.

* cited by examiner

| Device | Default Router List (Upstream route) | Routing Table (Downstream route) |
|---|---|---|
| DODAG Root (1) | Route to external network, etc. | RPL node (2) (via RPL node(2))<br>RPL node (3) (via RPL node(2)) |
| RPL node (2) | DODAG Root (1) | RPL node (3) (via RPL node(3)) |
| RPL node (3) | RPL node (2) | N/A |

COMMUNICATION APPARATUS AND COMMUNICATION METHOD

CROSS-REFERENCE TO RELATED APPLICATIONS

This application is based upon and claims the benefit of priority from Japanese Patent Application No. 2012-040476, filed Feb. 27, 2012, the entire contents of which are incorporated herein by reference.

FIELD

Embodiments described herein relate generally to communication.

BACKGROUND

Recently, smart grids have become globally popular. For a smart grid, an advanced metering infrastructure (AMI) system has been suggested, whereby various services are provided by means of smart meters connected to a TCP/IP network. For example, with the AMI system, an automatic meter reading (AMR) service in which a remote server acquires metering data from a smart meter via the TCP/IP network and analyzes the acquired data can be realized. In addition, with the AMI system, a demand response (DR) service in which the remote server controls a switch of the smart meter via the TCP/IP network can also be realized.

A networking protocol, the Routing Protocol for Low-power and Lossy Networks (RPL), developed by the Internet Engineering Task Force (IETF) of the International Standards Organization, provides a way of connecting a smart meter to a TCP/IP network. With RPL, smart meters distributed over a wide geographic area form a dynamic multi-hop mesh network and connect to a TCP/IP network.

To achieve secure communication over the multi-hop mesh network, a protocol called Protocol for Carrying Authentication for Network Access (PANA) Relay has been developed by the IETF. With PANA Relay, a key management server that manages encryption keys can securely distribute such keys, thereby enabling secure communication over the TCP/IP network and the multi-hop mesh network.

For the AMI system to provide various services (such as AMR and DR), a fully developed network infrastructure should be in place. Thus, there will be cases where smart meters that cannot independently communicate with remote servers exist locally unless not only the smart meters and remote servers (key management server, AMR server, DR server and so on) forming the AMI system, but also concentrators connecting these devices are deployed in sufficient numbers. In areas where such smart meters exist, various services are unavailable. On the other hand, there may be cases where smart meters are provided prior to installing concentrators while the AMI system has spread. Thus, there may occur isolated areas in which smart meters are already provided but AMI services are unavailable.

DETAILED DESCRIPTION

In the following, the embodiments will be described in detail with reference to the drawings.

In general, according to an embodiment, a communication apparatus includes a communication unit and a security control unit. The communication unit communicates with a smart meter by using a first communication interface for communicating with the smart meter, communicates with a first server which manages communication security keys and a second server which provides a service regarding the smart meter by using a second communication interface for communicating with the first server and the second server, and relays communication between the smart meter and the first server and second server by using the first communication interface and the second communication interface. The security control unit establishes first and second secure communication channels to the first server and second server, respectively when operation to the smart meter is started, performs mutual authentication with the first server and acquire a first key from the first server via the first secure communication channel, and relays mutual authentication with the first server and acquisition of a second key from the first server via the first secure communication channel for the smart meter.

Components which are the same as or similar to described components are denoted by the same or similar reference numerals, and duplicate descriptions are basically omitted.

First Embodiment

Figure 1:
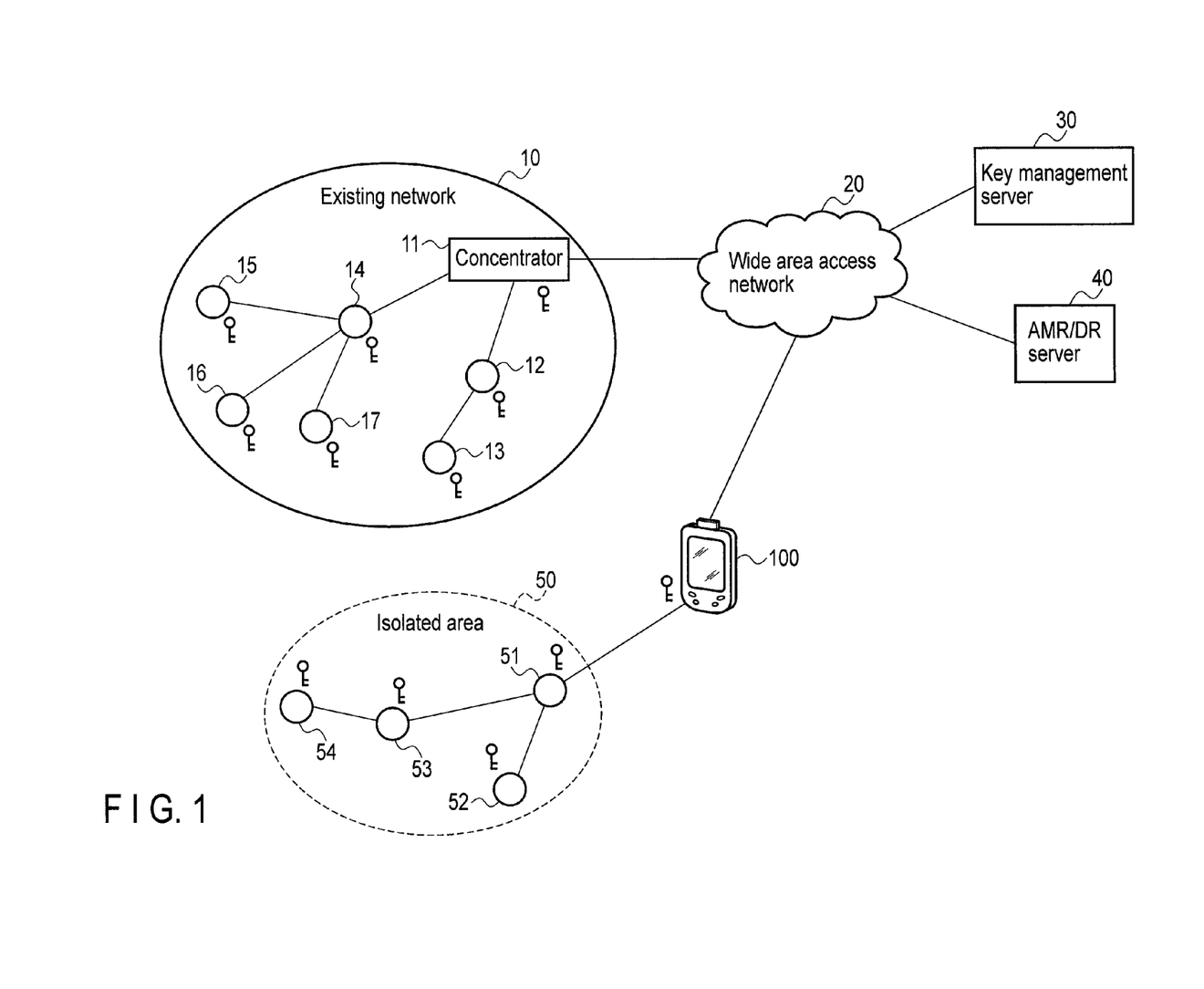
FIG. 1 is an exemplary diagram illustrating a communication system in which a communication apparatus according to the first embodiment is applied.

FIG. 1 illustrates a communication system in which a communication apparatus according to the first embodiment is applied. The communication system shown in FIG. 1 comprises an existing network 10, a wide area access network 20, a key management server 30, and an AMR/DR server 40. In the communication system shown in FIG. 1, smart meters 51, 52, 53 and 54 that cannot be independently connected to the wide area access network 20 are illustrated. The area in which the smart meters 51, 52, 53 and 54 are provided is called an isolated area 50.

In the existing network 10, a concentrator 11 and smart meters 12, 13, 14, 15, 16 and 17 are provided. The concentrator 11 mediates between a network of which the smart meters form nodes and the wide area access network 20. The smart meters 12, 13, 14, 15, 16 and 17 form a multi-hop mesh network having the concentrator 11 as the root. The smart meters 12, 13, 14, 15, 16 and 17 can be connected to the wide area access network 20 via the concentrator 11 (and a relay node if necessary).

The wide area access network 20 connects the concentrator 11, the key management server 30 and the AMR/DR server 40 so that they can communicate with each other. As described below, the communication apparatus 100 according to the present embodiment can be connected to the wide area access network 20 if necessary. The wide area access network 20 may be a wired network, a wireless network, or a combination thereof. The wireless network may be formed by 3G, WiMAX or the like. The wired network may be formed by Ethernet, an optical fiber cable or the like.

The key management server 30 is connected to the wide area access network 20. The key management server 30 performs mutual authentication relative to a smart meter via the wide area access network 20 (i.e., network access authentication) and distributes a communication security key.

The AMR/DR server 40 is connected to the wide area access network 20. The AMR/DR server 40 provides an AMR service or a DR service via the wide area access network 20. The AMR/DR server 40 may provide one of the AMR service and the DR service or both of them.

In the communication system shown in FIG. 1, the smart meters 12, 13, 14, 15, 16 and 17 perform mutual authentication to the key management server 30 via the concentrator 11 and the wide area access network 20, and each acquire a communication security key from the key management server 30 to secure communication. The smart meters 12, 13, 14, 15, 16 and 17 can use the AMR service or the DR service from the AMR/DR server 40 via the concentrator 11 and the wide area access network 20.

The communication apparatus 100 supports analysis and maintenance operations in an isolated area 50. Concretely, the communication apparatus 100 mediates between a network of which the smart meters 51, 52, 53 and 54 form nodes within the isolated area 50 and the wide area access network 20. As described below, the smart meters 51, 52, 53 and 54 within the isolated area 50 form a multi-hop mesh network including the communication apparatus 100 as the root. The multi-hop mesh network is merely an example, and the smart meters may form a multi-hop network, a mesh network or another network. The smart meters 51, 52, 53 and 54 can be connected to the wide area access network 20 via the communication apparatus 100 (and a relay node, if necessary).

In the communication system shown in FIG. 1, the smart meters 51, 52, 53 and 54 perform mutual authentication to the key management server 30 via the communication apparatus 100 and the wide area access network 20, and each acquire a communication security key from the key management server 30 to secure communication. The smart meters 51, 52, 53 and 54 can use the AMR service or the DR service from the AMR/DR server 40 via the communication apparatus 100 and the wide area access network 20. On the other hand, the communication apparatus 100 relays mutual authentication to the key management server 30 and acquisition of communication security keys from the key management server 30 for the smart meters 51, 52, 53 and 54, in order to secure communications of the smart meters 51, 52, 53 and 54. In addition, the communication apparatus 100 relays communication between the smart meters 51, 52, 53 and 54 and the AMR/DR server 40 in order to provide the AMR service or the DR service to the smart meters.

Figure 2:
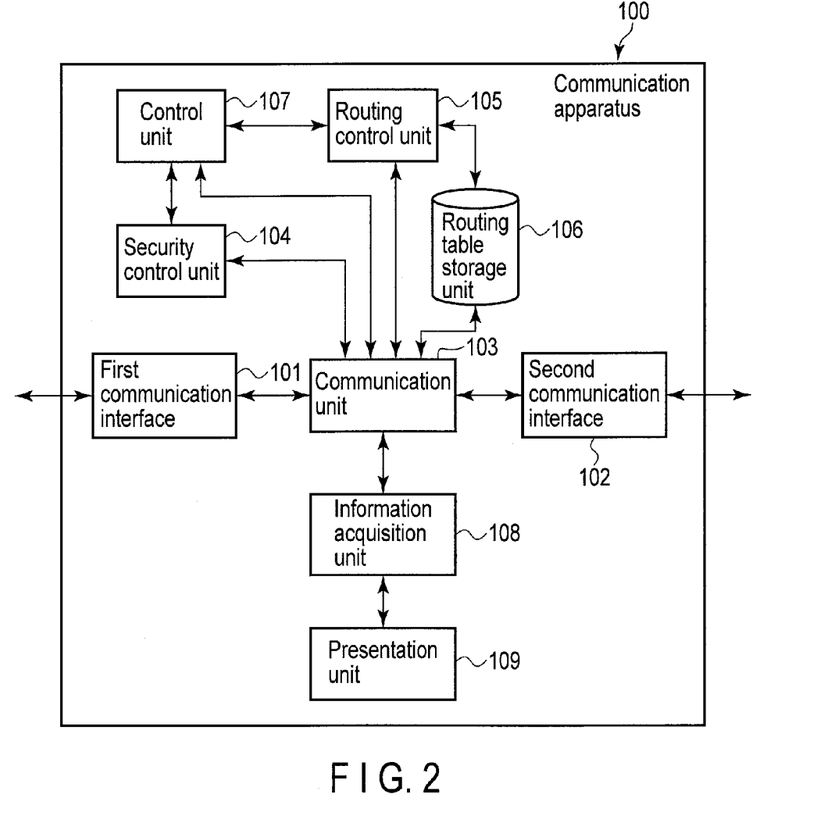
FIG. 2 is an exemplary block diagram showing the communication apparatus according to the first embodiment.

As shown in FIG. 2, the communication apparatus 100 comprises a first communication interface 101, a second communication interface 102, a communication unit 103, a security control unit 104, a routing control unit 105, a routing table storage unit 106, a control unit 107, an information acquisition unit 108, and a presentation unit 109.

In the following, each unit included in the communication apparatus 100 will be explained as being implemented by hardware, but may be implemented by software.

It is desirable that the communication apparatus 100 is portable. That is, it is desirable that the size, weight and shape of the communication apparatus 100 be suitable to enable it to be carried by a service person (user) who may perform analysis and maintenance operations. This improves the efficiency of analysis and maintenance operations. In addition, the service person can easily perform analysis and maintenance operations in multiple isolated areas with one communication apparatus 100 if he moves with it.

The first communication interface 101 allows the communication apparatus 100 to communicate with smart meters (for example, smart meters 51, 52, 53 and 54 shown in FIG. 1). The communication apparatus 100 and the smart meters can form a multi-hop mesh network, for examples.

The second communication interface 102 allows the communication apparatus 100 to communicate with a remote server (for example, the key management server 30 and the AMR/DR server 40 shown in FIG. 1). Typically, the wide area access network 20 including 3G, WiMAX, or the like is formed between the communication apparatus 100 and the remote server.

The communication unit 103 communicates with a smart meter by using the first communication interface 101 or communicates with the remote server via the wide area access network 20 by using the second communication interface 102. The communication unit 103 also relays communication between a smart meter and the remote server by using the first communication interface 101 and the second communication interface 102.

To operation of the communication unit 103 may be controlled by the security control unit 104, the routing control unit 105, the control unit 107 and the information acquisition unit 108.

For example, the communication unit 103 establishes secure communication channels (e.g., VPN) to the key management server 30 and to the AMR/DR server 40 in response to a request from the security control unit 104 described later. The communication unit 103 accesses the key management server 30 via the established secure communication channel. The communication unit 103 performs mutual authentication between the communication apparatus 100 and the key management server 30 (i.e., transmitting a credential stored in the communication apparatus 100) and acquires a communication security key from the key management server 30 if required. The communication unit 103 relays mutual authentication with the key management server 30 (i.e., transmitting a credential stored in a smart meter) and relays acquisition of a communication security key from the key management server 30 if required.

In addition, the communication unit 103 transmits a signal indicating network information by multicasting (advertising network information) in response to a request from the routing control unit 105 described later, receives a signal for searching for the network information from a smart meter, transmits a signal indicating the network information to a smart meter that is searching, and receives a signal for requesting downstream route setting from a smart meter that has been determined to join the network.

Further, the communication unit 103 accesses the AMR/DR server 40 via the wide area access network 20 by using the second communication interface 102 in response to a request from the information acquisition unit 108 described below. The communication unit 103 receives necessary information from the AMR/DR server 40 and outputs the received information to the information acquisition unit 108.

The security control unit 104 controls the communication unit 103 to secure communication for the communication apparatus 100 and a smart meter. Concretely, the security control unit 104 establishes secure communication channels between the communication apparatus 100 and the key management server 30 and between the communication apparatus 100 and the AMR/DR server 40. The security control unit 104 performs mutual authentication between the communication apparatus 100 and the key management server 30 via the secure communication channel and acquires a communication security key from the key management server 30. The security control unit 104 also relays, for a smart meter, mutual authentication with the key management server 30 via the secure communication channel and acquisition of a communication security key from the key management server 30.

The routing control unit 105 controls the communication unit 103 to form a multi-hop mesh network (or a multi-hop network) having the communication apparatus 100 as the root. Concretely, the routing control unit 105 transmits a signal indicating network information by multicasting, receives a signal for searching for the network information from a smart meter, transmits a signal indicating the network information to a smart meter that is searching, receives a signal for requesting downstream route setting from a smart meter that has been determined to join the network, and then sets the downstream route (that may includes a hop route) to the smart meter. The routing control unit 105 stores the set routing information in the routing table storage unit 106 as routing table described below.

The routing table storage unit 106 stores a routing table indicating the routing information set by the routing control unit 105. The routing table stored in the routing table storage unit 106 may be read by the communication unit 103 and the routing control unit 105 if required. In view of security, the routing table storage unit 106 may be provided outside the communication apparatus 100 (e.g., in a remote server).

The control unit 107 performs various types of control, including state transitions of the security control unit 104 and the routing control unit 105. The control unit 107 is capable of controlling the communication unit 103 to perform various operations.

The information acquisition unit 108 controls the communication unit 103 to acquire information regarding analysis operation, maintenance operation and so on. Concretely, the information acquisition unit 108 acquires information from the AMR/DR server 40. The information acquisition unit 108 outputs the acquired information to the presentation unit 109.

The presentation unit 109 inputs information from the information acquisition unit 108 and displays it. The presentation unit 109 may be a display capable of displaying information as an image or a text, or a lighting element (e.g., an LED lamp) capable of displaying information in accordance with the state of lighting. The presentation unit 109 may be a speaker capable of outputting information as sound.

The operation of the communication apparatus 100 will be explained with reference to FIGS. 3A, 3B, 3C, 3D and 3E.

Figure 3A:
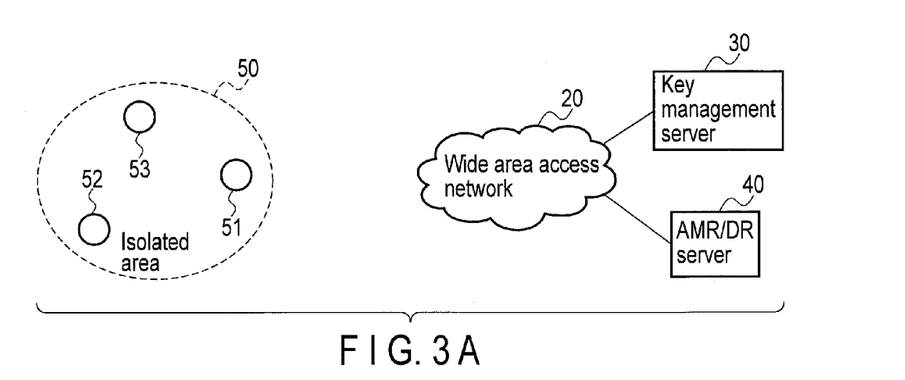
FIG. 3A is an exemplary diagram illustrating the operation of the communication apparatus according to the first embodiment.

When analysis or maintenance operations using the communication apparatus 100 are not performed, the smart meters 51, 52, and 53 provided in the isolated area 50 cannot be connected to the wide area access network 20, as shown in FIG. 3A. Accordingly, the smart meters 51, 52, and 53 cannot be connected to the key management server 30 or the AMR/DR server 40, and cannot use the AMR/DR service.

Figure 3B:
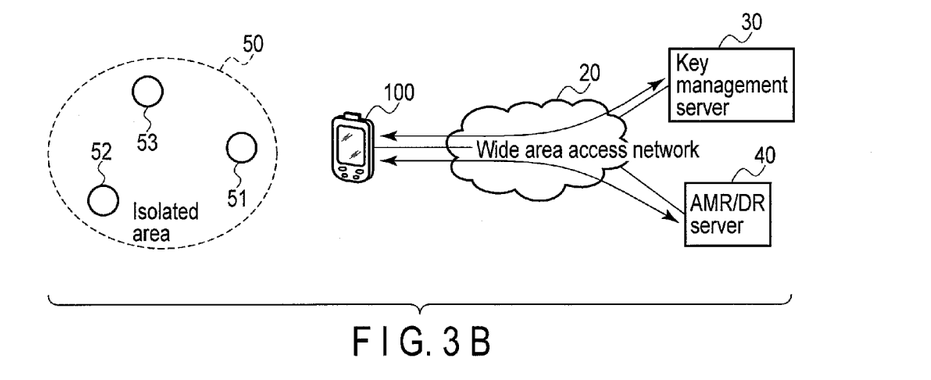
FIG. 3B is an exemplary diagram illustrating the operation of the communication apparatus according to the first embodiment.

The service person can start analysis or maintenance operations using the communication apparatus 100 by moving to the vicinity of the isolated area 50, if necessary. Once the analysis or maintenance operation using the communication apparatus 100 is started, the communication apparatus 100 establishes secure communication channels to the key management server 30 and the AMR/DR server 40, as shown in FIG. 3B. The communication apparatus 100 can establish the secure communication channels based, for example, on the virtual private network (VPN). Then, the communication apparatus 100 performs mutual authentication with the key management server 30 via the secure communication channel and acquires a key from the key management server 30. The communication apparatus 100 acquires the key from the key management server 30 based, for example, on IETF protocol for carrying out authentication for network access (PANA).

Figure 3C:
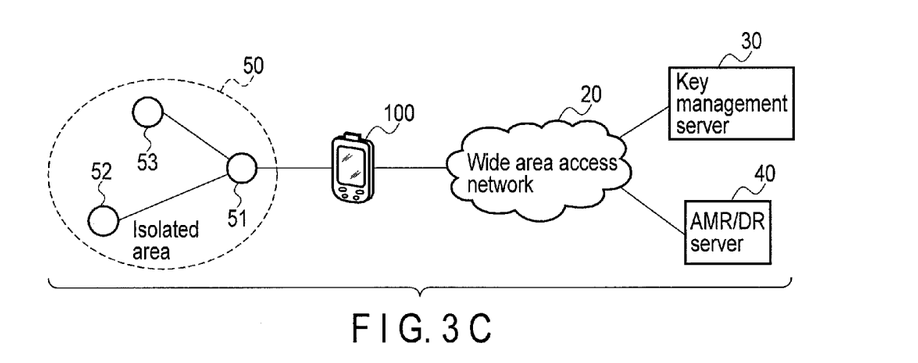
FIG. 3C is an exemplary diagram illustrating the operation of the communication apparatus according to the first embodiment.

The communication apparatus 100 performs routing control after establishing the secure communication channels to the key management server 30 and the AMR/DR server 40 and acquiring the key from the key management server 30. As a result of the routing control, the smart meters 51, 52, and 53 provided in the isolated area 50 form a secure multi-hop mesh network having the communication apparatus 100 as the root, as shown in FIG. 3C.

IETF RPL can be used for forming the secure multi-hop mesh network having the communication apparatus 100 as the root. Concretely, it is necessary for the communication apparatus 100 to function as a gateway between the wide area access network 20 and the multi-hop mesh network. Thus, the communication apparatus 100 has a function of destination oriented directed acyclic graph root (DODAG Root) in the RPL. With the RPL, a route from the DODAG Root, which is the border router to each RPL node, is automatically searched, and a DODAG (i.e., multi-hop mesh network) is formed. Since the DODAG allows multi-hop communication, the communication apparatus 100 can communicate with a smart meter provided outside of its own coverage area through one or more other smart meters. That is, with the DODAG, the coverage area of the communication apparatus 100 is substantially expanded. This improves the efficiency of analysis or maintenance operations carried out by the service person.

Figure 3D:
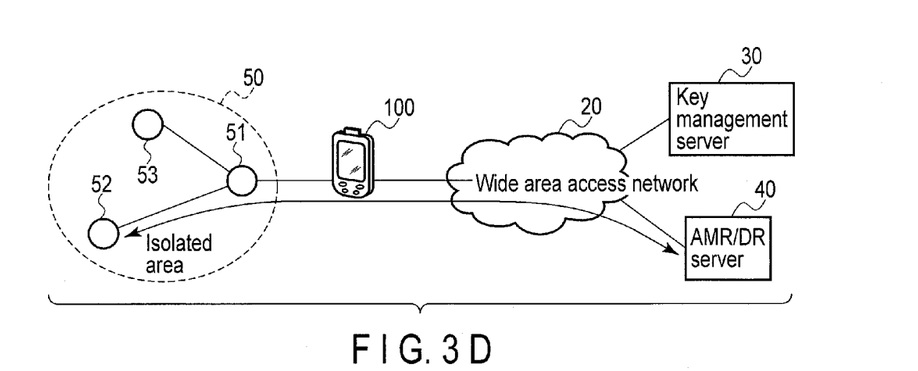
FIG. 3D is an exemplary diagram illustrating the operation of the communication apparatus according to the first embodiment.

Once the secure multi-hop mesh network having the communication apparatus 100 as the root is formed, the smart meters 51, 52, and 53 provided in the isolated area 50 can access the AMR/DR server 40 via the communication apparatus 100 and the wide area access network 20. As shown in FIG. 3D, the AMR/DR service is securely provided to the smart meters 51, 52, and 53.

Information communicated between the smart meters 51, 52, and 53 and the AMR/DR server 40 (for example, metering data or maintenance data of smart meters, topology information of the formed multi-hop mesh network, or the like) does not need to be stored in the communication apparatus 100. Since communication security keys for the smart meters 51, 52, and 53 are distributed through mutual authentication with the key management server 30, not with the communication apparatus 100, it is not necessary for the communication apparatus 100 to store the credentials for the smart meters 51, 52, and 53. Rather, without storing the above information and the credentials into the communication apparatus 100, it is possible to prevent abuse of them (for example, leakage of customer information, unauthorized access to the AMI system, or the like) by a third party if the communication apparatus 100 is lost or stolen.

However, the credential of the communication apparatus 100 and the communication security key distributed to the communication apparatus 100 have to be stored in the communication apparatus 100. There is a possibility that data stored in the communication apparatus 100 may be acquired by an unauthorized third party if the communication apparatus 100 is lost or stolen. However, this unauthorized acquisition of data can be prevented easily.

If the communication apparatus 100 is lost or stolen, the key management server 30 can stop or reject authentication of the credential of the communication apparatus 100. This prevents the communication apparatus 100 from acquiring a key from the key management server 30, and the communication apparatus 100 cannot communicate with a smart meter.

Even if the communication apparatus 100 has acquired a key before the key management server 30 stops or rejects authentication of the credential, since a key generally has an expiration period, the communication apparatus 100 cannot communicate with smart meters after the expiration period. In other words, the communication apparatus 100 can perform unauthorized communication with a smart meter until the expiration period. To avoid this, it is desirable that the key management server 30 quickly updates the key distributed to the smart meter.

For example, the key management server 30 may explicitly request a smart meter to update the key, or the key management server 30 may respond to a request periodically transmitted from a smart meter to maintain connection so as to shorten the expiration period of the key. In either case, the key of the smart meter is quickly updated, and the communication apparatus 100 is unable to communicate with the smart meter.

Figure 3E:
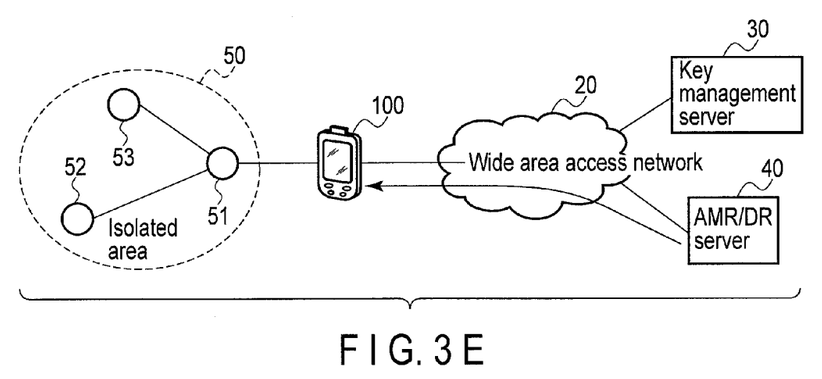
FIG. 3E is an exemplary diagram illustrating the operation of the communication apparatus according to the first embodiment.

As explained with reference to FIGS. 3B, 3C and 3D, the service person can carry out analysis and maintenance operations in the isolated area 50 by using the communication apparatus 100. As stated above, the information communicated between the smart meters 51, 52, and 53 and the AMR/DR server 40 does not have to be stored in the communication apparatus 100. However, it is expected that there is a case where the service person has to check the information or processed information (analysis results) depending on what kinds of analysis and maintenance operations are carried out. In such a case, the communication apparatus 100 acquires necessary information from the AMR/DR server 40 via the wide area access network 20 and displays it as shown in FIG. 3E. The service person can effectively carry out analysis and maintenance operations by referring to the displayed information.

When the communication apparatus 100 attempts to acquire necessary information from the AMR/DR server 40 via the wide area access network 20, access to the information may be limited. Concretely, when the communication apparatus 100 accesses the AMR/DR server 40, authentication of the service person may be performed.

For example, authentication of the service person may be realized by the communication apparatus 100 accessing the AMR/DR server 40 by using a Web browser, and requesting input of a service person name and a password when accessing a Web site corresponding to the AMR/DR server 40.

The communication apparatus 100 may comprise a human interface device (HID) such as a keyboard, a touch panel, or a numeric keypad to receive input of the service person's name and password. As a result of authentication, an access right is assigned to the communication apparatus 100 in accordance with the service person type (e.g., service person's status, employment condition or the like) and the type of operation.

The communication apparatus 100 cannot acquire information beyond the access right because of the limitation of access, and the usage of information is desirably limited. For example, it is possible to prevent a case where the service person unjustly acquires information not related to the required operation, and the customer information is leaked.

Figure 6:
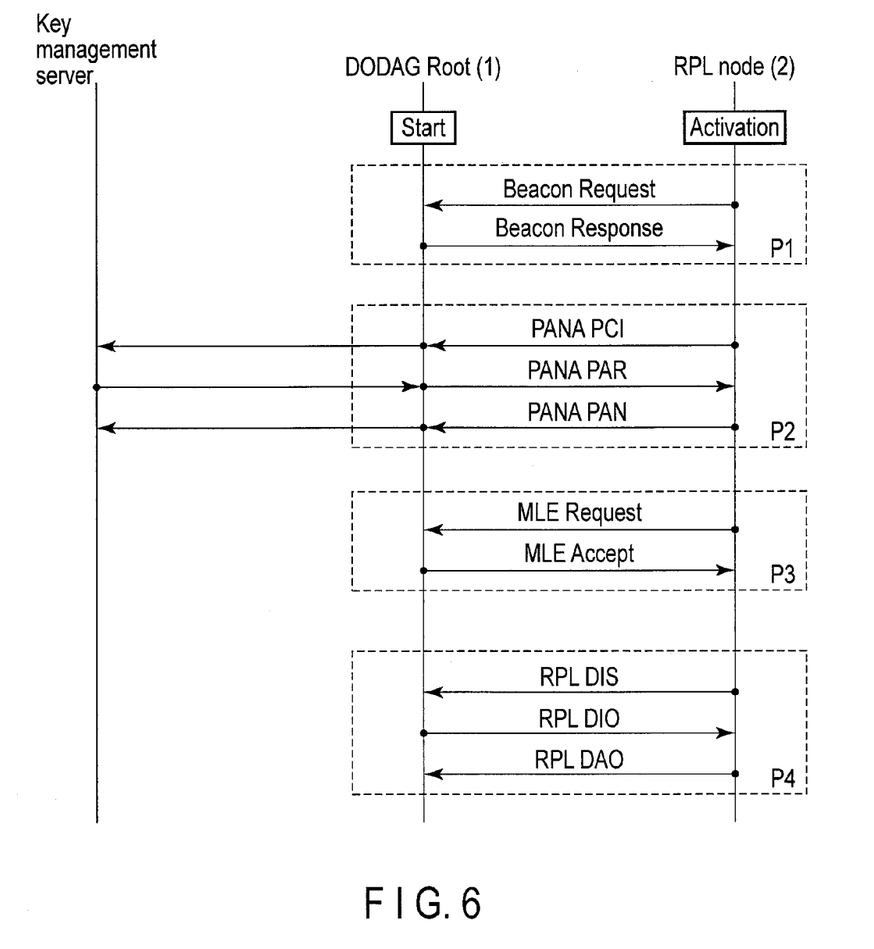
FIG. 6 illustrates the procedure sequence for forming the multi-hop mesh network including the communication apparatus according to the first embodiment as the root.

The process of forming the multi-hop mesh network having the communication apparatus 100 as the root will be explained with reference to FIG. 6. FIG. 6 shows the process until a RPL node (2) (corresponding to a smart meter) joins the multi-hop mesh network having a DODAG Root (1) (corresponding to the communication apparatus 100) as the root.

The RPL node (2) performs a channel scan by using a Beacon frame in a media access control (MAC) layer when the RPL node (2) does not join the multi-hop mesh network (phase P1). The RPL node (2) searches for a PANA Relay (PRE) node in accordance with the results of the channel scan. The PRE node can perform mutual authentication with the key management server 30 and acquire a key from the key management server 30 based on PANA, instead of the RPL node (2). In this example, the DODAG Root (1) is searched as a PRE node of the RPL node (2).

In FIG. 6, IEEE 802.15.4 is adopted as a MAC layer standard; however, a protocol independent from the MAC layer is used for mutual authentication and routing control. Accordingly, another MAC layer standard may be adopted instead. For example, a power line communication (PLC) standard (e.g., IEEE 1901.2, ITU-T G9956), IEEE 802.3 wired LAN standard, or IEEE 802.11 wireless LAN standard may be adopted.

When a PRE node has been searched, the RPL node (2) utilizes the PRE node to perform mutual authentication with the key management server 30 and acquires a key from the key management server 30 in accordance with PANA (phase P2). The end point of the TCP/IP network as a destination of authentication request is the DODAG Root (1) searched as a PRE node. The DODAG Root (1) relays mutual authentication with the key management server 30 and acquisition of a key from the key management server 30, based on the PANA Relay technique, for example.

Once the RPL node (2) acquires the key, the RPL node (2) synchronizes a frame counter of IEEE 802.15.4 with the DODAG Root (1) (phase P3). Synchronizing the frame counters prevents replay attacks by an unauthorized third party. The frame counters may be synchronized by using the IETF mesh link establishment (MLE) technique, for example. MLE is an example of a technique for synchronizing frame counters when adopting IEEE 802.15.4 as the MAC layer standard. The frame counters may be synchronized by another technique (for example, a technique recommended in another MAC layer standard).

The RPL node (2) is allowed to access the multi-hop mesh network through phases P1, P2 and P3, and communication is secured by using the key acquired from the key management server 30. In this state, routing control described below is performed in accordance with RPL, for example (phase P4). As a result, the RPL node (2) joins the multi-hop mesh network, and establishes communication with the AMR/DR server 40.

Although it is not shown in FIG. 6, the RPL node (2) can function as the PRE node corresponding to another RPL if needed after joining the multi-hop mesh network. By this function, another RPL node provided outside of the coverage area of the DODAG Root (1) and within the coverage area of the RPL node (2) joins the multi-hop mesh network through the RPL node (2). The multi-hop mesh network having the communication apparatus 100 as the root is automatically formed in the same process.

Figure 4:
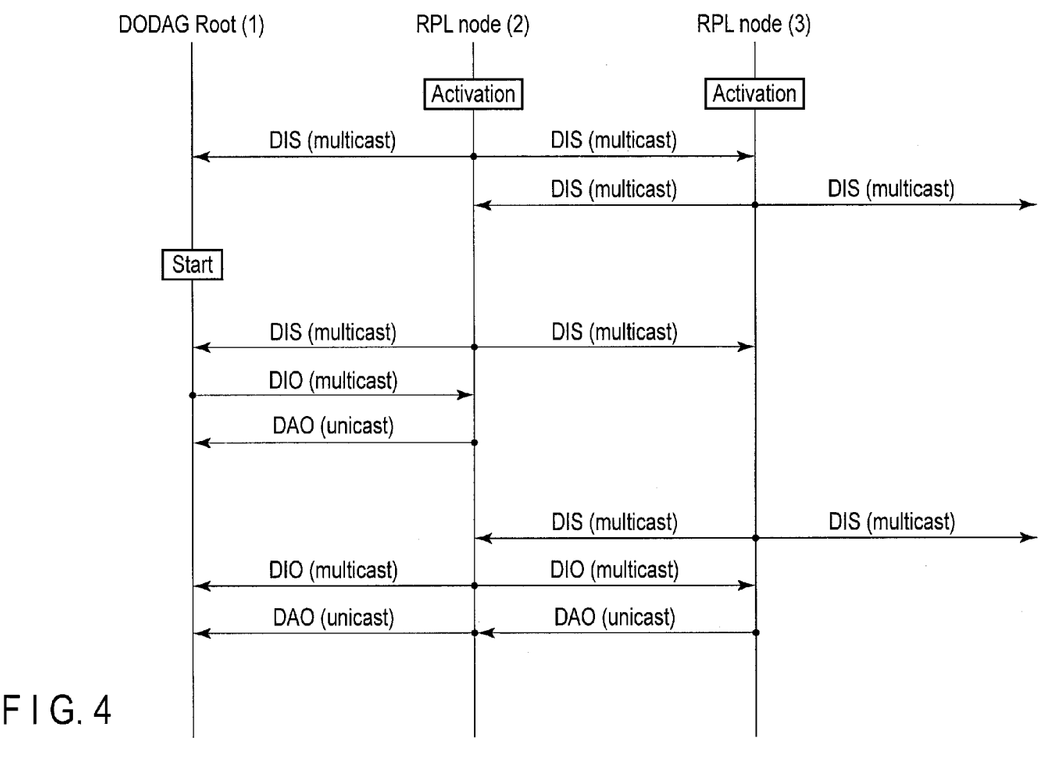
FIG. 4 illustrates the sequence of routing control in the multi-hop mesh network including the communication apparatus according to the first embodiment as the root.

The aforementioned routing control (for example, phase P4 in FIG. 6) is performed as shown in FIG. 4.

The RPL node (2) and an RPL node (3) periodically transmit a DODAG information solicitation (DIS) packet by multicasting when they do not join the multi-hop mesh network. The DIS packet is transmitted at fixed or variable intervals. The DIS packet corresponds to a signal for searching for network information.

The DODAG Root (1) periodically transmits a DODAG information object (DIO) packet by multicasting after initiating the routing control. The DIO packet may be transmitted at fixed or variable intervals. The DIO packet corresponds to a signal indicating network information. The DODAG Root (1) sends the DIO packet back upon reception of the aforementioned DIS packet.

Once the RPL node (2) has received the DIO packet, the RPL node (2) determines to join the network and sets the DODAG Root (1) that is the transmission source of the DIO packet as an upstream route. In addition, the RPL node (2) transmits a DAO packet to the DODAG Root (1) set as the upstream route in order to establish connection with a remote server. The DAO packet corresponds to a signal for requesting setting of a downstream route.

The DODAG Root (1) sets the RPL node (2) that is the transmission source of the DAO packet as a downstream route upon reception of the DAO packet. On the other hand, the RPL node (2) that has determined to join the network starts to periodically transmit the aforementioned DIO packet by multicasting.

The RPL node (3) determines to join the network and sets the RPL node (2) that is the transmission source of the DIO packet as an upstream route upon reception of the DIO packet. The RPL node (3) transmits the DAO packet to the RPL node (2) set as the upstream route in order to establish communication with a remote server.

The RPL node (2) sets the RPL node (3) that is the transmission source of the GAO packet as a downstream route upon reception of the DAO packet. The RPL node (2) forwards the received DAO packet to the DODAG Root (1). The DODAG Root (1) sets the RPL node (3) that is the transmission source of the DAO packet as a downstream route upon reception of the DAO packet. Since the RPL node (3) performs multi-hop connection to the DODAG Root (1) via the RPL node (2), the DODAG Root (1) sets the RPL node (2) as a hop route to the RPL node (3).

Figure 5:
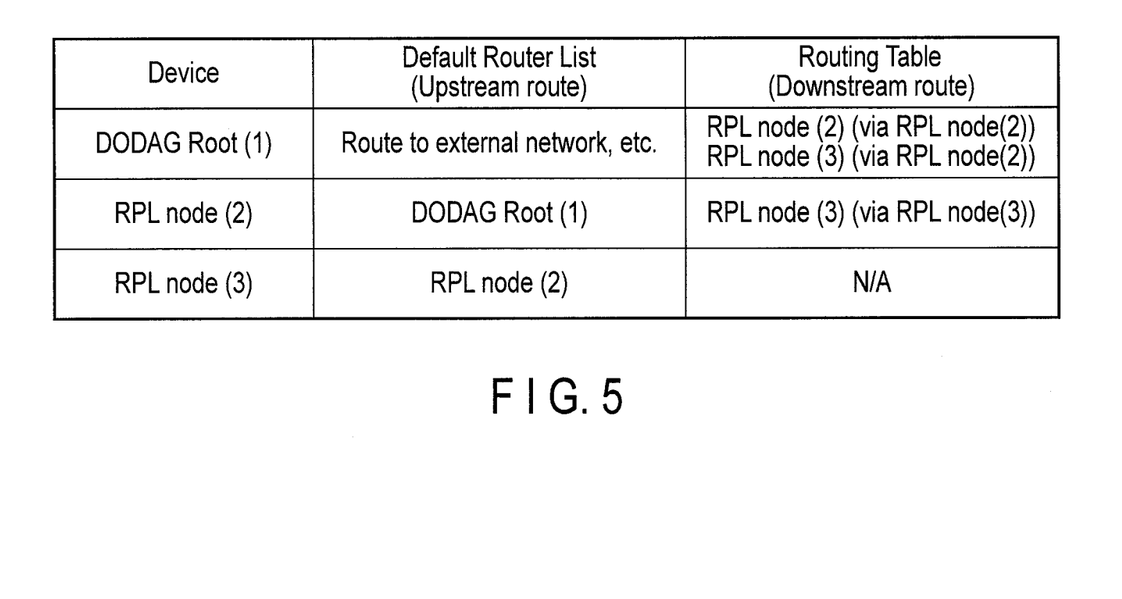
FIG. 5 is an exemplary table indicating routing information derived from the routing control shown in FIG. 4.

As a result of routing control as shown in FIG. 6, routing information shown in FIG. 5 is derived. FIG. 5 shows information specifying a device (for example, device name, IP address or MAC address) and routing information corresponding to the device. The device column includes information specifying the communication apparatus 100 and each smart meter joining the multi-hop mesh network having the communication apparatus 100 as the root. The default router list (upstream route) column includes routing information set as a corresponding upstream route for each device. The routing table (downstream route) column includes routing information set as a corresponding downstream route (may include a hop route) for each device. The routing table stored in the aforementioned routing table storage unit 106 includes routing information for the communication apparatus 100.

Figure 7:
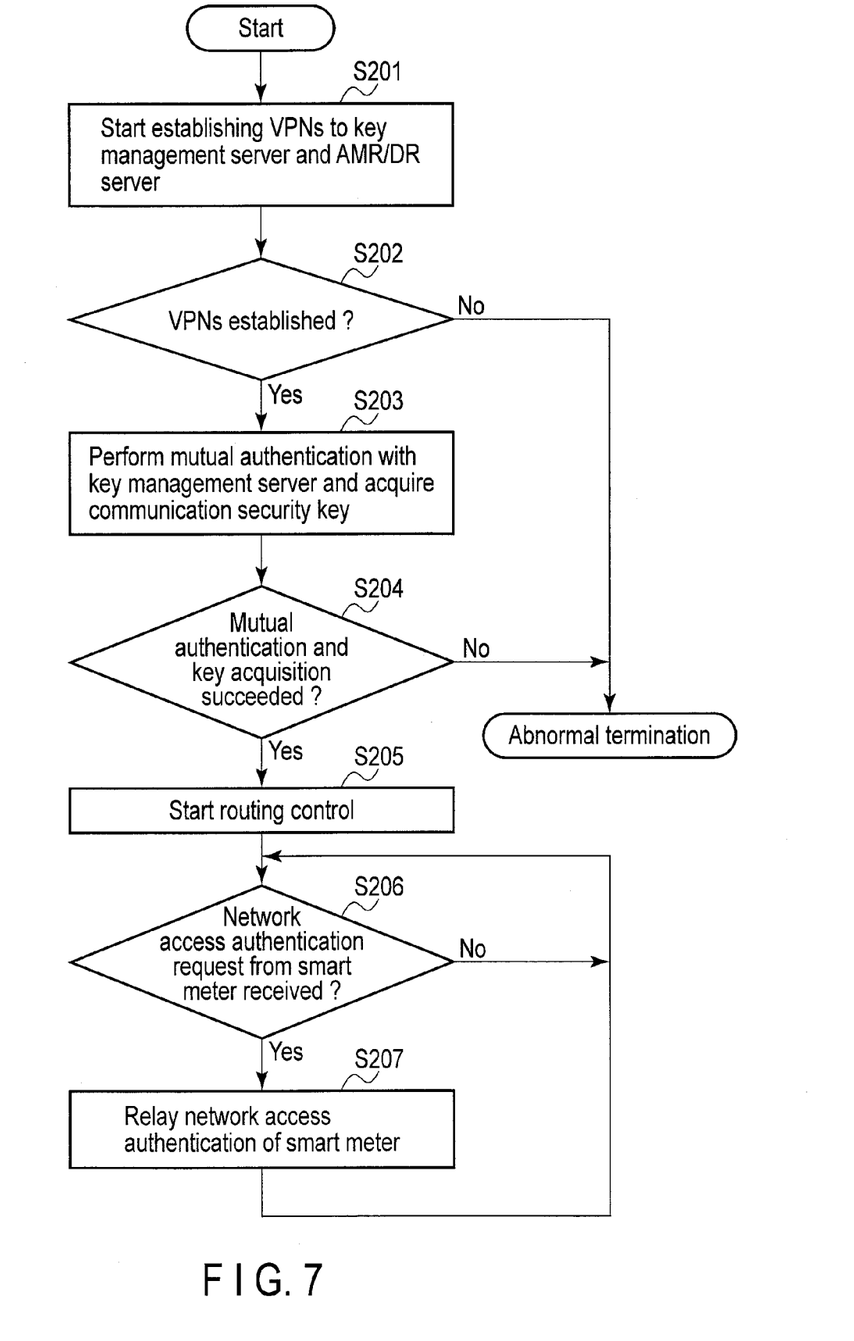
FIG. 7 is an exemplary flowchart showing the operation of the communication apparatus according to the first embodiment.

The operation of the communication apparatus 100 from when the analysis or maintenance operation is started to when the multi-hop mesh network having the communication apparatus 100 as the root is formed will be explained with reference to FIG. 7. Each operation shown in FIG. 7 may be performed via control of the security control unit 104 and the routing control unit 105 by the control unit 107, or autonomously performed by the security control unit 104 and the routing control unit 105. The analysis and maintenance operations may be started in accordance with the service person's instructions or automatically started under a certain condition.

When the analysis or maintenance operation is started, the security control unit 104 controls the communication unit 103 to attempt to establish secure communication channels (e.g., VPN) to the key management server 30 and the AMR/DR server 40 (step S201). If the secure communication channels cannot be established (step S202), the communication apparatus 100 cannot securely communicate with the key management server 30 or the AMR/DR server 40, and the analysis or maintenance operation may be abnormally terminated. Alternatively, step S201 may be iterated until the secure communication channels are established.

If the secure communication channels are established (step S202), the security control unit 104 controls communication unit 103 to attempt to perform mutual authentication with the key management server 30 and acquire a key through the secure communication channel (step S203).

If mutual authentication and key acquisition failed (step S204), the communication apparatus 100 cannot securely communicate with a smart meter, and the analysis or maintenance operation may be abnormally terminated. Alternatively, step S203 may be iterated until mutual authentication and key acquisition are successfully completed.

If authentication and key acquisition are successfully completed (step S204), the routing control unit 105 starts routing control (step S205). The detailed process of the routing control is as described above. After the routing control is started, every time mutual authentication is requested from a smart meter (step S206), the security control unit 104 controls the communication unit 103 to relay, for the smart meter, mutual authentication with the key management server 30 and key acquisition from the key management server 30 (step S207).

Figure 8:
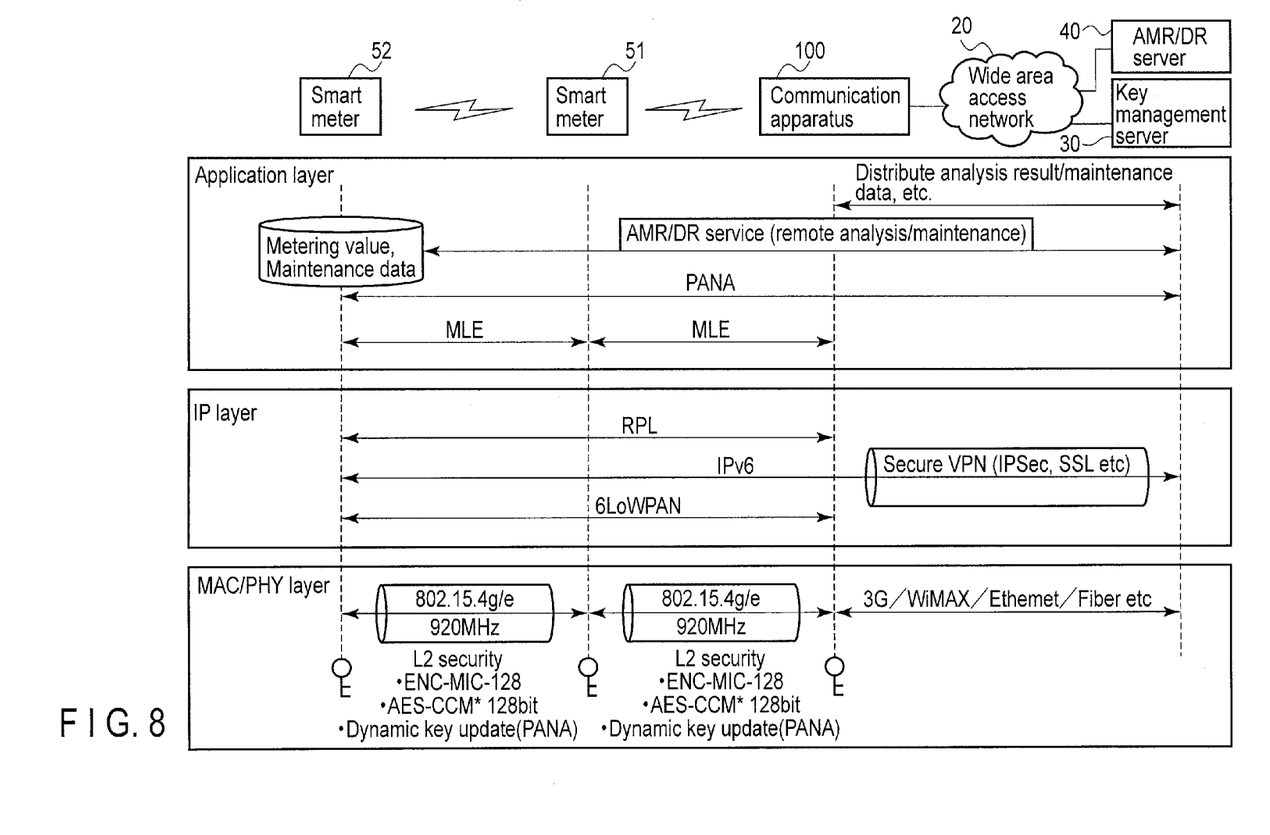
FIG. 8 is an exemplary diagram showing the available communication standards in the communication system in which the communication apparatus according to the first embodiment is applied for each layer.

FIG. 8 shows available communication standards for each of the PHY/MAC layer, IP layer and application layer in the present embodiment. FIG. 8 shows that the specific low power radio of 900 MHz is adopted for the PHY layer, and IEEE 802.15.4 standard is adopted for the MAC layer in the multi-hop mesh network having the communication apparatus 100 as the root. Since the higher layer protocol and application are independent from the PHY/MAC layer, a different communication standard (not shown) may be adopted for the PHY/MAC layer. In FIG. 8, the layer 2 link security based on the advanced encryption standard (AES): FIPS Pub 197 defined under the IEEE 802.15.4 is adopted to achieve communication security in the multi-hop mesh network having the communication apparatus 100 as the root.

As explained above, the communication apparatus according to the first embodiment comprises the communication interface to communicate with a smart meter and the communication interface to communicate with a remote server, and relays communication between the smart meter and the remote server. With the communication apparatus, various services of the AMI system can be provided to a smart meter provided in an isolated area.

In addition, the communication apparatus according to this embodiment establishes a secure communication channel to a remote server every time an analysis or maintenance operation is started. The communication apparatus performs mutual authentication with the key management server and acquires a key from the key management server via the secure communication channel. The communication apparatus also relays mutual authentication with the key management server and key acquisition from the key management server via the secure communication channel for a smart meter. With this communication apparatus, a smart meter provided in the isolated area can utilize various services of the AMI system with secured communication similar to the existing network.

Further, although the communication apparatus according to this embodiment relays communication between a smart meter and a remote server, the communication apparatus may not store information communicated between the smart meter and the remote server (for example, smart meter credential, metering data or the like). With the communication apparatus, even if a service person has lost the communication apparatus, or the communication apparatus has been stolen, it is possible to prevent leakage of customer information or unauthorized access to the AMI system.

Second Embodiment

In the first embodiment, the communication apparatus 100 communicates with the key management server 30 and the AMR/DR server 40 via the wide area access network 20. As stated above, although the communication apparatus 100 relays communication between a smart meter and the AMR/DR server 40, the communication apparatus 100 may not store information communicated between the smart meter and the AMR/DR server 40. This structure can decrease risk when the communication apparatus 100 is lost or stolen.

However, the functions of the key management server 30 and the AMR/DR server 40 may be implemented by software executed on the communication apparatus 100. In such a case, since the communication apparatus 100 has to store information that it is not necessary to store in the first embodiment, it is difficult to decrease risk if the communication apparatus 100 is lost or stolen. However, since this structure does not require communication with the wide area access network 20, it is possible to reduce the manufacturing cost and maintenance cost of the communication apparatus 100.

In this embodiment, information collected from a smart meter is at least temporarily stored in the communication apparatus 100. The stored information can be managed by updating the server at an office by a service person, for example. In addition, as stated above, in the present embodiment, the risk incurred if the communication apparatus 100 is lost or stolen is greater than in the case of the first embodiment. Therefore, it is desirable to encrypt information prior to storing it, or to apply user authentication for operation of the communication apparatus 100.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
a first communication interface;
a second communication interface controllable to communicate with a wide area access network selected from the group consisting of a wired network, a wireless network, or a combination thereof;
a communication unit configured to control the first communication interface to communicate with a smart meter, configured to control the second communication interface to communicate with a first server and a second server, the first server managing communication security keys and the second server providing a service regarding the smart meter, and configured to control the first and second communication interfaces to relay communication between the smart meter and the first server and second server; and
a security control unit configured to establish first and second secure communication channels to the first server and second server, respectively when operation to the smart meter is started, perform mutual authentication with the first server and acquire a first key from the first server via the first secure communication channel, and relay mutual authentication with the first server and acquisition of a second key from the first server via the first secure communication channel for the smart meter.

2. The apparatus according to claim 1, further comprising:
a routing control unit configured to control a route on a multi-hop mesh network having the apparatus as a root; and
a storage unit configured to store a routing table indicating a route searched in the multi-hop mesh network.

3. The apparatus according to claim 1, further comprising:
an acquisition unit configured to acquire information relating to the operation from the second server; and
a presentation unit configured to present the information.

4. The apparatus according to claim 2, wherein the routing control unit is based on Internet Engineering Task Force Routing Protocol for Low-power and Lossy Networks (IETF RPL).

5. The apparatus according to claim 1, wherein the security control unit is based on Internet Engineering Task Force Protocol for Carrying Authentication for Network Access (IETF PANA) and IETF PANA Relay.

6. A non-transitory computer readable storage medium storing instructions of a computer program which when executed by a computer results in performance of steps comprising:
communicating, by a communication unit, with a smart meter by using a first communication interface for communicating with the smart meter, communicating, by the communication unit, with a first server and a second server by using a second communication interface, the first server managing communication security keys and the second server providing a service regarding the smart meter, and relaying, by the communication unit, communication between the smart meter and the first server and second server by using the first communication interface and the second communication interface; and establishing, by a security control unit, first and second secure communication channels to the first server and second server, respectively when operation to the smart meter is started, performing, by the security control unit, mutual authentication with the first server and acquire a first key from the first server via the first secure communication channel, and relaying, by the security control unit, mutual authentication with the first server and acquisition of a second key from the first server via the first secure communication channel for the smart meter.

7. The non-transitory computer readable storage medium according to claim 6, wherein the steps further comprises:
controlling, by a routing control unit, a route on a multi-hop mesh network having the apparatus as a root; and
storing, by a storage unit, a routing table indicating a route searched in the multi-hop mesh network.

8. The non-transitory computer readable storage medium according to claim 6, wherein the steps further comprises:
acquiring, by an acquisition unit, information relating to the operation from the second server; and
presenting, by a presentation unit, the information.

9. The non-transitory computer readable storage medium according to claim 7, wherein the routing control unit is based on Internet Engineering Task Force Routing Protocol for Low-power and Lossy Networks (IETF RPL).

10. The non-transitory computer readable storage medium according to claim 6, wherein the security control unit is based on Internet Engineering Task Force Protocol for Carrying Authentication for Network Access (IETF PANA) and IETF PANA Relay.

11. A communication method, comprising:
communicating with a smart meter by using a first communication interface, communicating with a first server and a second server using a second communication interface, the first server managing communication security keys and the second server providing a service regarding the smart meter, and relaying communication between the smart meter and the first server and second server by using the first communication interface and the second communication interface; and establishing first and second secure communication channels to the first server and second server, respectively when operation to the smart meter is started, performing mutual authentication with the first server and acquire a first key from the first server via the first secure communication channel, and relaying mutual authentication with the first server and acquisition of a second key from the first server via the first secure communication channel for the smart meter.

* * * * *